(12) United States Patent
Iida et al.

(10) Patent No.: US 7,236,447 B2
(45) Date of Patent: Jun. 26, 2007

(54) OPTICAL DISK, METHOD OF PLAYING OPTICAL DISK, AND OPTICAL DISK DRIVE

(75) Inventors: Tamotsu Iida, Tsuchiura (JP); Toshinori Sugiyama, Tsukuba (JP); Reiji Tamura, Moriya (JP); Hideki Nagano, Yuki-Gun (JP); Toshiaki Taii, Moriya (JP); Yuji Yamazaki, Toride (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 511 days.

(21) Appl. No.: 10/760,585

(22) Filed: Jan. 21, 2004

(65) Prior Publication Data
US 2004/0156289 A1   Aug. 12, 2004

(30) Foreign Application Priority Data
Jan. 21, 2003   (JP)  ............................ 2003-012807

(51) Int. Cl.
*G11B 7/00* (2006.01)
(52) U.S. Cl. ............................. 369/275.3; 369/53.21; 369/53.22; 369/59.17
(58) Field of Classification Search ............ 369/275.3, 369/53.2, 53.22, 59.17, 53.21
See application file for complete search history.

(56) References Cited

U.S. PATENT DOCUMENTS 5,499,229 A * 3/1996 Murakami et al. .......... 369/111
6,407,969 B1 * 6/2002 Spruit ...................... 369/53.34
6,795,389 B1 * 9/2004 Nishiuchi et al. ......... 369/275.3
2002/0031070 A1 * 3/2002 Hayashi ................... 369/53.22
2003/0048725 A1 * 3/2003 Lee et al. ................ 369/59.13
2005/0190677 A1 * 9/2005 Stebbings et al. ....... 369/53.21

FOREIGN PATENT DOCUMENTS

JP    A 9-91781      4/1997
JP    A 2002-197670  7/2002

* cited by examiner

*Primary Examiner*—Wayne Young
*Assistant Examiner*—LaTanya Bibbins
(74) *Attorney, Agent, or Firm*—Oliff & Berridge, PLC

(57) ABSTRACT

An optical disk includes a recording region formed on a substrate for recording user data, and a management region formed on the substrate which includes an identification information region for recording disk-specific identification information such as address information (ID), a SYNC code, or an error detection code (EDC). The identification information region in this optical disk has a flat portion (a mirror region) formed by means of sectioning part of a groove or a land in a given step. The disk-specific identification information is recorded on the identification information region inclusive of this mirror region as irreversible record marks. Moreover, a signal of the disk-specific identification information is detected by a laser beam which is servoed on the recording track of this optical disk. Then, a change in the detected signal level of the disk-specific identification information is detected based on a predetermined threshold level.

14 Claims, 11 Drawing Sheets

OPTICAL DISK, METHOD OF PLAYING OPTICAL DISK, AND OPTICAL DISK DRIVE

BACKGROUND OF THE INVENTION

1. Field of the Invention

The present invention relates to an optical disk and a method of playing an optical disk. More specifically, the present invention relates to an optical disk which records disk-specific identification information for preventing unauthorized copying, a method of playing the optical disk, and an optical disk drive.

2. Related Art

Conventionally, each optical disk records disk-specific identification information in order to prevent unauthorized copying. As a typical conventional art of recording the identification information on an optical disk, for example, the burst cutting area (BCA) recording method used in a digital versatile disk (DVD) is known.

The BCA recording method is a method configured to form a non-reflective portion on a plurality of tracks by partially fusing a reflective layer of a disk by means of laser trimming, then to dispose this non-reflective portion in a bar code fashion, and thereby to record the identification information on the optical disk which is unique thereto. The BCA recording method is effective for a playback-only disk such as a CD-ROM or a DVD-ROM which only has the reflective layer. However, a BCA writer is very expensive and thereby causes a cost increase.

A write-once optical disk such as a CD-R or a DVD-R does not allow overwriting of the recorded information. Therefore, it is possible to record the disk-specific identification information by use of a recorder. On the contrary, in the case of a magneto-optical disk or a phase-change optical disk, it is possible to overwrite the recorded information. A conceivable method in this case is a method of recording disk-specific identification information by irreversibly changing a recording film using slower line speed and higher laser power than the case of recording normal information (Japanese Unexamined Patent Publication No. Hei9 (1997)-091781), or alternatively, a method of recording disk-specific identification information by forming irreversible marks in a manufacturing step by applying stronger laser power or extending laser radiation time longer than the case of recording normal information, and by alternately disposing regions of the plurality of irreversible marks and regions of normal reversible marks on the outside of a user data area (Japanese Unexamined Patent Publication No. 2002-197670). When the irreversible marks are formed on a rewritable optical disk according to the above-described methods, there is no risk of erasing the formed marks.

However, there is a subtle difference between a signal level of the irreversible mark formed by the above-described method and a signal level of the reversible mark formed by the normal recording power. Accordingly, illegal copy products may be produced by artificially forming illegal marks on a disk, which is not provided with the disk-specific identification information in advance, by use of a normal drive.

Similarly, there is no distinctive difference between the signal levels when the disk-specific identification information is formed in advance as a prepit on a recordable optical disk. For this reason, the disk-specific identification information becomes common at a stamper level. Accordingly, it is necessary to distinguish the optical disks on which the same identification information is formed in advance as the prepit.

SUMMARY OF THE INVENTION

An object of the present invention is to provide an optical disk on which irreversible and unerasable disk-specific identification information is formed so as to prevent unauthorized copying.

Another object of the present invention is to provide a method of playing an optical disk capable of easily identifying an unauthorized copy disk which is produced by a method such as groove recording using a normal drive.

Still another object of the present invention is to provide an optical disk drive capable of detecting an unauthorized copy disk.

To attain the foregoing objects, the present invention provides an optical disk using grooves and/or lands for recording tracks and having a recording layer which can record information. Here, the optical disk includes a track structure for recording disk-specific identification information, the track structure facilitating distinction of copied information. According to the present invention, a flat portion (a mirror region) wider than a track width is formed on part of a land track in a management information region provided outside a user data area, then the disk-specific identification information is formed as a irreversible record mark on the land track including this mirror region, and then the disk-specific identification information is played back in a track-on state where tracking is applied to a groove adjacent to the land track recording the disk-specific identification information. In this event, a legitimate optical disk is easily distinguished by use of a threshold level provided between a signal level of the land track and a signal level of the irreversible record mark in a signal level of the mirror region. A data volume necessary for the disk-specific identification information is in a range from several bytes to several tens of bytes, and a necessary length in a track direction of the mirror region is in a range from several micrometers to several tens of micrometers. Accordingly, tracking will not be deviated even if part of the land track is cut off in the track direction. As described above, since the data volume of the disk-specific identification information accounts for several bytes at the maximum, the mirror regions only need to be provided in several positions at appropriate intervals within one circle of the track. Alternatively, the mirror regions may be formed on several tracks in duplicate, or may be divided into fractions of several bytes each and located dispersedly.

According to the present invention, it is possible to provide a copy protected optical disk and copyrighted work protecting means capable of easily detecting an unauthorized copy product, without providing a drive or the optical disk with a complicated mechanism. The characteristics of the present invention are as follows.

1) In the present invention, the disk-specific identification information is recorded on a track adjacent to a recording track and is detected as an information signal by crosstalk during playback. In this way, even if copied information is recorded as the same signal as the identification signal on the adjacent tracks on both sides, it is difficult to align phases of positions of the record marks on the mutually adjacent recording tracks due to an influence of rotation jitters of a drive spindle. As a result, it is possible to distinguish the copied information which is recorded later from the identification information which is unique to the legitimate disk. In this way, it is possible to detect the copy product. Particularly, it is difficult to align the phases of the positions of the record marks in a CLV drive.

2) Moreover, in the present invention, the disk-specific identification information is formed as the record mark across the mirror region and the land track while three different states of signal levels are mixed in an amplitude fluctuation of this record mark, and these three states are detected by a method provided with threshold levels corresponding to the respective signal levels. In this way, even if an unauthorized copy is recorded on an optical disk without formation of the mirror region, only two states out of the three states are detected. It is therefore possible to detect a copy product because playback of the region recording the disk-specific identification information or playback of the record mark falls incomplete. As described above, according to the present invention, even if the identification information which is unique to the legitimate disk is illegally copied on a groove track of an optical disk not recording the disk-specific identification information, it is possible to distinguish such an optical disk from the optical disk recording the disk-specific identification information in advance.

DETAILED DESCRIPTION OF THE PREFERRED EMBODIMENTS

Figure 1:
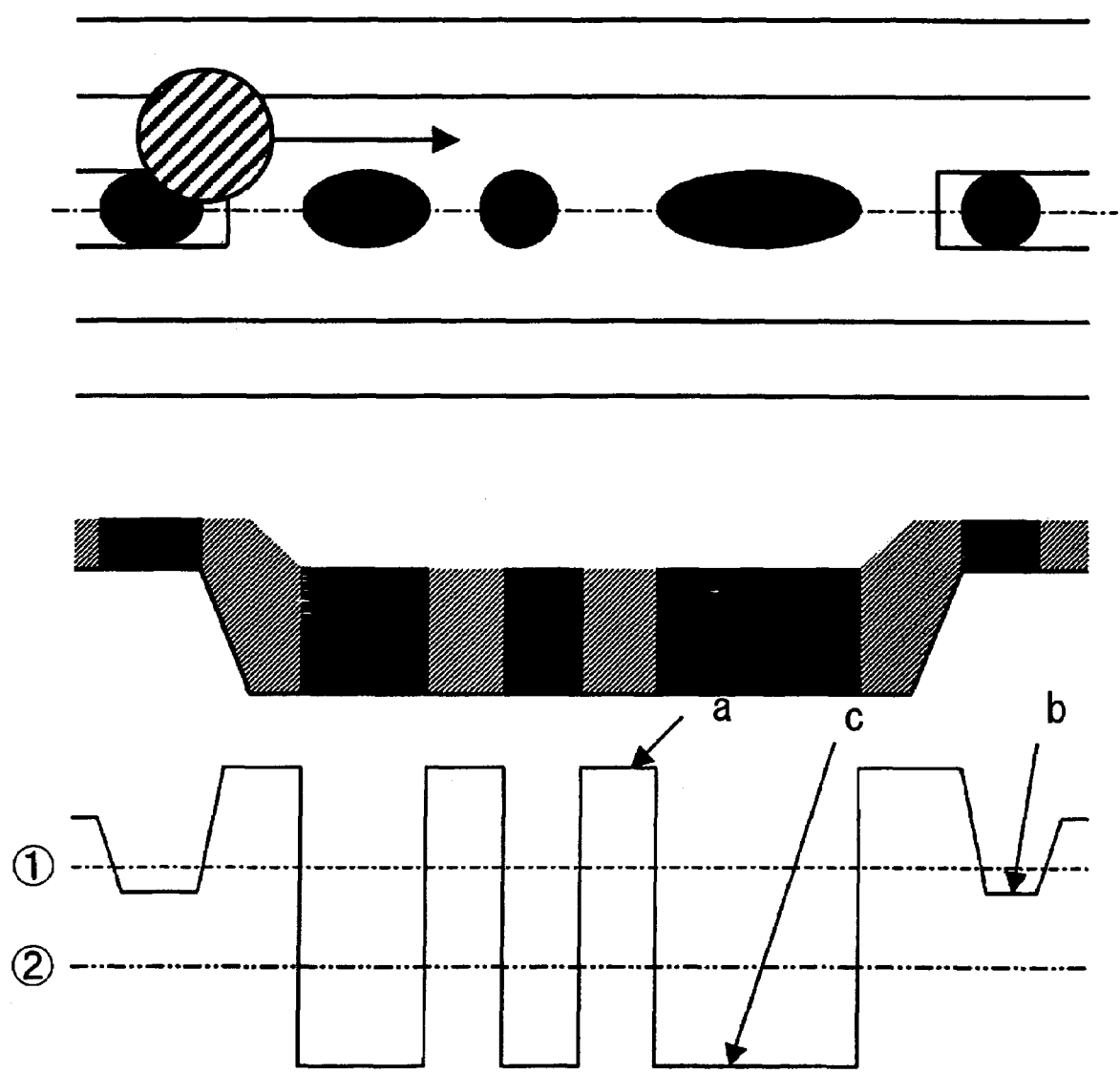
FIG. 1 is a schematic diagram for explaining Embodiment 1 of the present invention.

FIG. 1 is a view for explaining Embodiment 1 of the present invention. FIG. 1 shows a relation between a pattern of record marks in a region in a dye coating-type optical disk for recording disk-specific identification information and a signal waveform playback.

The dye coating-type optical disk shown in FIG. 1 includes groove tracks and land tracks. Part of the land track is sectioned by given steps and a flat portion (a mirror region) having the same height as the groove track adjacent to this land track. The width of this mirror region in the perpendicular direction to the track direction is wider in terms of the radial direction than the width of the land track. The disk-specific identification information is recorded on this mirror region and front and back edges of the steps that form the mirror region.

The mirror region formed on part of the land track is flat within the range of an effective beam diameter unlike the land tracks or the groove tracks. Accordingly, reflectance in the mirror region is increased (to an "a level"). As a result, a level difference with a signal level of the land track (a "b level") occurs in the mirror region. Moreover, signal amplitude of the record mark formed in the mirror region becomes larger than that of a normal record mark formed on the recording track. For this reason, there is a large amount of crosstalk from the land track upon playback while tracking on the adjacent groove track, and it is thereby possible to detect the record mark formed in the mirror region as an information signal.

First, description will be made on the case of the dye coating-type optical disk configured to record the information on the groove tracks. In the case of the dye coating type optical disk, a groove portion has a thicker dye film thickness than that of a land portion. Moreover, the mirror region also has a thicker dye film thickness than that of a land track portion. Accordingly, the difference in the signal amplitude becomes more significant. For this reason, when the disk-specific identification information is formed as an irreversible record mark on the land track including the mirror region, the record mark formed in this mirror region shows an amplitude change which is greater than that of the record mark formed on the land track (a to c), and the level thereof falls below the signal level (b) of the record mark formed on the land track. As a result, three states with different signal levels are mixed. Accordingly, when threshold levels ((1) and (2)) corresponding to the respective signal levels are set up for detecting these three states, it is easily possible to distinguish the optical disks copied in a large quantity by forming the disk-specific identification information in advance as a prepit, from a disk recording an unauthorized copy.

Specifically, when the disk-specific identification information is formed as the record mark by use of the prepit, it is impossible to form the record mark on both of the land portion and the groove portion. Considering that a land is formed as a continuous set of pits, it is obviously impossible to distinguish the land portion from the pits.

Meanwhile, distinction is also possible in the case when an unauthorized copy of the identification unique to a legitimate disk is recorded on a groove track of an optical disk not recording the disk-specific identification information. Firstly, when the unauthorized copy is recorded on an optical disk without formation of the mirror region, it is possible to distinguish the disk by detecting a mirror level in a region recording the disk-specific identification information or by detecting a playback level of the record mark. Secondly, when the disk-specific identification information is recorded on adjacent groove tracks located on both sides of the land track that is supposed to record the identification information, it is difficult to align phases in the track direction based on a boundary between the land and mirror regions of the record mark formed on both sides of the groove tracks within two groove tracks having each different addresses, due to an influence of rotation jitters of a spindle for rotating the optical disk. As a result, it is possible to distinguish the unauthorized copy from the identification information unique to the legitimate disk.

Here, it is preferable to record the disk-specific identification information by biphase modulation or the like. When the mark of the disk-specific identification information is formed by converting one bit into two bits by the biphase modulation, even if an unauthorized copy is formed on this disk-specific identification information, a mark of the unauthorized copy is easily detected as unauthorized information because a form of the mark violates biphase modulation rules.

To be more precise, by using conversion rules to convert data "0" into data "01" and convert data "1" into data "10" in accordance with the biphase modulation, for example, combinations of data "0" and "1" consist of "00", "11", "01", and "10", and no other combinations may occur. When "0" or "1" continues for three or more times, for example, "000" or "111", such a code can be detected as a state out of the biphase conversion rules. Normally, such a state out of the biphase conversion rules is assumed to occur when the unauthorized copy is overwritten. Therefore, the overwritten unauthorized copy is detected as an error. In other words, the overwritten unauthorized copy is detected as a series of marks having a length of three pieces or more, which never falls 2 and below. According to this method, it is impossible to falsify the disk-specific identification information data.

As described above, when the disk-specific identification information is recorded in another form to be converted by an appropriate conversion method instead of recording in the original form, then even if the data are falsified, the falsified data can be discovered easily because the data are detected as patterns other than the normally used modulation codes and error handling is therefore executed.

Although the biphase modulation has been described as an example of the modulation method for the disk-specific identification information, it is to be noted that the modulation method is not limited only to biphase modulation.

Figure 4:
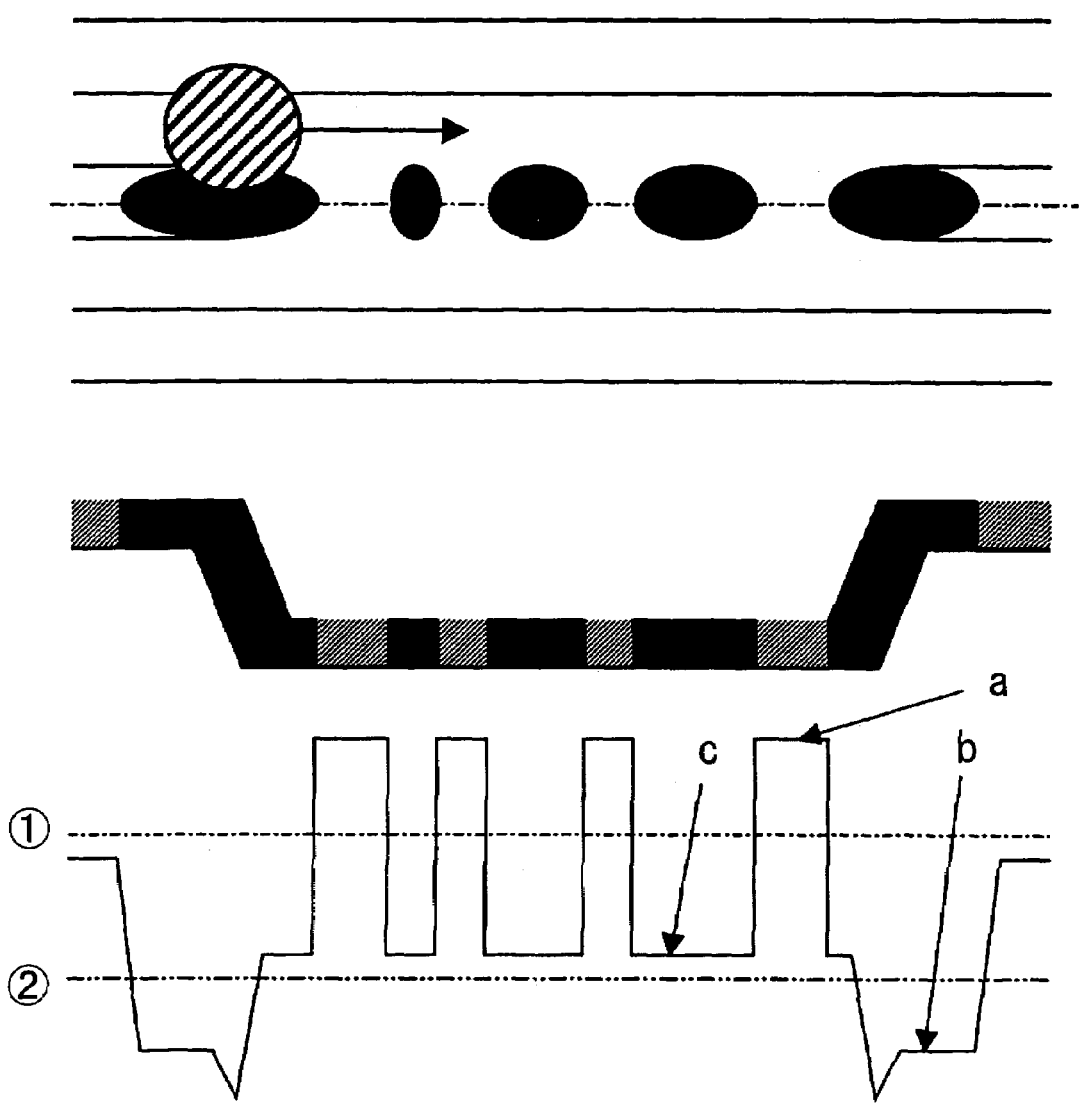
FIG. 4 is a schematic diagram for explaining Embodiment 2 of the present invention.
Figure 5:
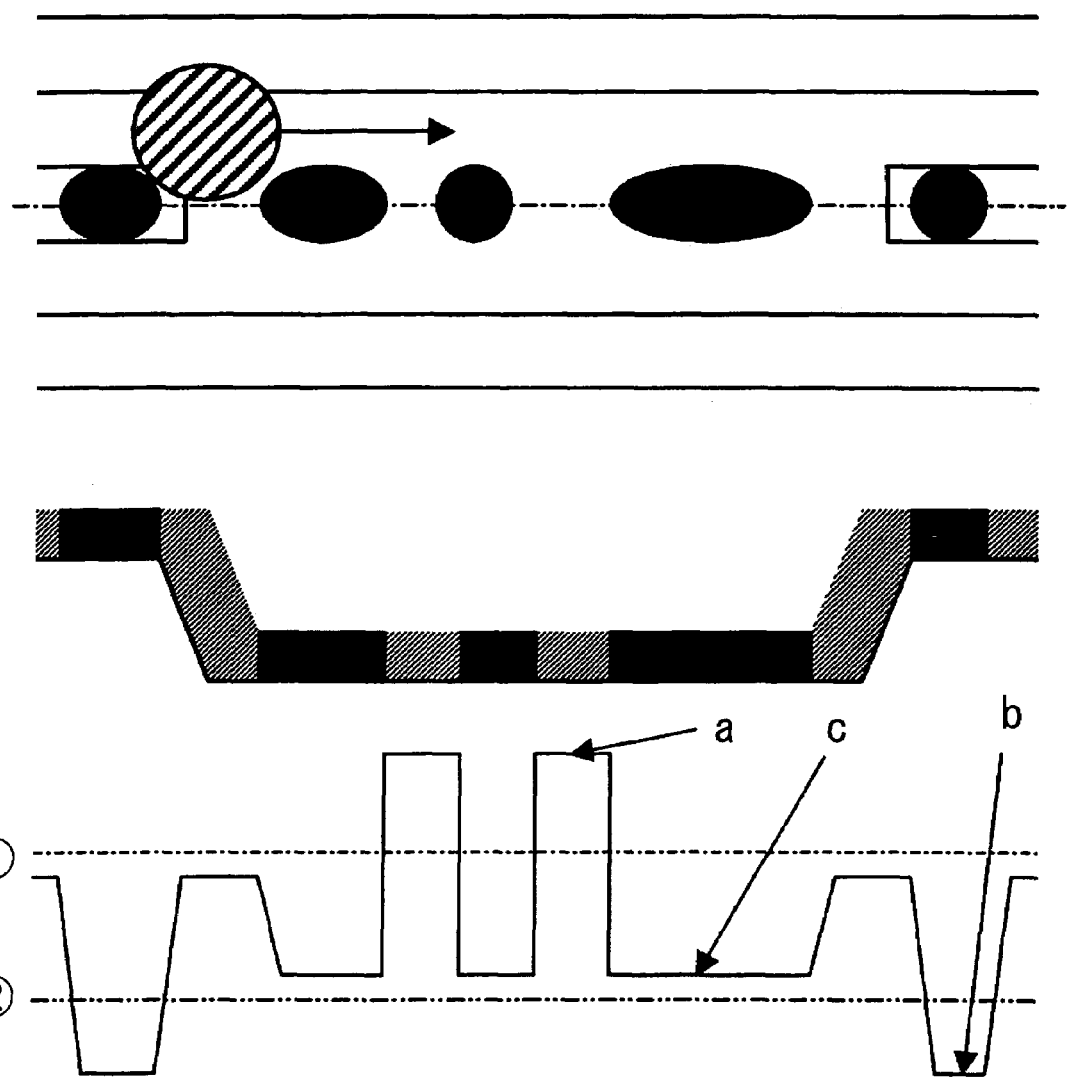
FIG. 5 is a schematic diagram for explaining a modified example of Embodiment 2 of the present invention.

Next, description will be made on the case of a phase-change optical disk including lands and grooves, which allows information overwriting. FIG. 4 is a view for explaining Embodiment 2 of the present invention. FIG. 4 shows a record mark formed across a land portion and a mirror region in the phase-change optical disk. FIG. 5 is a view for explaining a modified example of Embodiment 2 of the present invention. FIG. 5 shows record marks formed separately at the land portion and in the mirror region in the phase-change optical disk. Playback signal levels at the boundaries of the land portions and the mirror region are different between FIG. 4 and FIG. 5. However, as shown respectively in FIG. 4 and FIG. 5, it is possible to detect the playback signal in a similar way by setting a detection level (2). As similar to the case of the dye coating type optical disk, since reflectance is high (at an "a level") in the mirror region which is formed by cutting part of the land off in the track direction, a signal level (a "c level") in the position of the record mark formed in the mirror region becomes greater than a signal level (a "b level") in the position of the record mark formed on the land track. In other words, the signal level (the "b level") in the position of the record mark formed on the land track becomes lower than the signal level (the "c level") in the position of the record mark formed in the mirror region. As described above, three states with different signal levels are mixed in the playback signal. Accordingly, when threshold levels corresponding to the respective signal levels are set up for detecting the playback signal, it is easy to distinguish the optical disks copied in a large quantity by forming the disk-specific identification information in advance as a prepit, from a disk recording an unauthorized copy. Moreover, data both in the land and the groove are played back by use of a drive corresponding to land/groove recording. Accordingly, the disk-specific identification information recorded on the land track can be played back directly from the land track.

Although description has been made above on the case of the land track, this mode is similarly applicable to a recordable optical disk. Specifically, regardless of whether the shape of the groove in the optical disk is concave or convex when viewed from a side of reading information, the steps formed in the groove are detected as optical phase differences. For this reason, except for the fact that a dye film thickness of a concave track when viewed from a coating surface is increased in the case of the dye coating-type optical disk, while a dye film thickness of a convex track is decreased, and that degrees of signal modulation recorded in the respective tracks do not coincide with each other, in the case of the recordable optical disk other than the phase-change optical disk or the dye coating-type optical disk, it is possible to distinguish the optical disks copied in a large quantity from a disk recording an unauthorized copy, by forming the flat portion on part of the group track.

Incidentally, management information residing in an information management region of the optical disk is recorded by a manufacturer and cannot be overwritten by a user. In this way, existence of an unauthorized copy is monitored. Due to this fact, provision of means for detecting the existence of overwriting of the management information to the optical disk is effective for preventing an unauthorized copy. Meanwhile, in order to record all the management information irreversibly on the optical disk, it is possible to use a write-once optical disk. The write-once optical disk may be, for example, the phase-change optical disk or the dye coating type optical disk.

Moreover, in the phase-change optical disk including at least the groove and being configured to allow information overwriting, a management region is provided for recording the information by use of a mark which is irreversibly formed outside the recording region for user data. In addition, at least any of a SYNC code and an error detection code (EDC) is irreversibly recorded in this management region. Accordingly, it is possible to detect the existence of overwriting based on a change in a playback signal length of the SYNC code attributable to overwritten information or a change in the error detection code (EDC) calculated from the overwritten management information. That is, the management information in the information management region is recorded by the manufacturer and prevention of the unauthorized copy is attempted by prohibiting the user from overwriting the management information. Accordingly, provision of the means for detecting the existence of overwriting of the management information to the optical disk is effective for preventing the unauthorized copy. On the other hand, in order to record all the management information irreversibly on the optical disk, a recording device bears more burdens because the device needs to apply high power for recording in a larger region as compared to normal overwriting conditions. However, this mode is also effective as the management information is prevented from being overwritten.

As described above, the threshold levels for playing back the disk-specific identification information vary between the case of using a dye coating-type material for a recording layer of the optical disk and the case of using a rewritable phase-change-type material. Moreover, the threshold levels for playing back the disk-specific identification information also vary between the case of using only the groove tracks as recording tracks and the case of using both of the lands and the grooves. Therefore, in order to play back the disk-specific identification information promptly, it is preferable to record medium-type information for representing the type of the disk in advance on the disk, and to play back the disk-specific identification information by use of the threshold levels determined based on this medium type information. Here, the medium-type information is information concerning a disk type (such as a rewritable type, a write-once type, a playback-only type, or a combination thereof), the reflectance, the position of the recording track (such as the lands only, the grooves only, or both of the lands and the grooves), a type of a recording layer material (such as the dye, the phase-change, or magneto-optical), playback power, recording polarity (such as whether the reflectance of the record mark is increased or decreased as compared to a state before recording), and the like. In addition, information concerning a version of written standards defining the above-described information can be also regarded as the medium-type information. A method of recording the medium type information on the optical disk includes a method of forming the information as the prepit with concavo-convex portions, a method of recording the information with a laser, and the like. Moreover, it is also possible to record the medium-type information in a lead-in region and the like along the recording track, and to play back the information in the state where focusing and tracking are turned on. Furthermore, it is also possible to record the medium-type information in the form of bar codes and to play back the information in the state where only the focusing is turned on.

When the recording layer of the optical disk is formed with the coating-type dye material, it is possible to use publicly known dye materials which effectuate fine recording and playback by use of a laser beam. For example, the dye materials include: polymethine dyes such as a cyanine dye, a squalirium dye, or an azulenium dye; macrocyclic azaannulene dyes such as a phthalocyanine dye; and organic dyes which are changed in quality by light irradiation, such as a dithiol dye, a porphycene compound, or an annulene compound. The organic dye materials may be composed of a single material or a mixture of two or more types of organic dye materials described above.

In particular, when the wavelength of the laser beam used for playing back the record is in the vicinity of 400 nm, it is preferable to use the porphycene compound or the annulene compound as the recording material.

The porphycene compound is expressed by the following general formula (1):

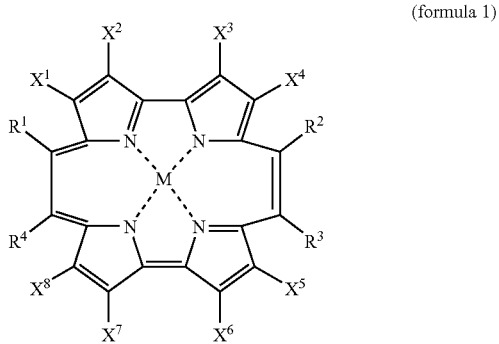

(formula 1)

Here, in the general formula (1), each of $R^1$ to $R^4$ is independently any of: a hydrogen atom; a halogen atom; a hydroxyl group; and a straight-chain or branched alkyl group having the carbon number from 1 to 20, such as a methyl group, an ethyl group, an n-propyl group, an isopropyl group, an n-butyl group, a tert-butyl group, a sec-butyl group, an n-pentyl group, or an n-hexyl group. In the general formula (1), each of $X^1$ to $X^8$ is independently any of: a hydrogen atom; a halogen atom; a hydroxyl group; a formyl group; a carboxyl group; a cyano group; a nitro group; an amino group; a sulfonate group; a straight-chain or branched alkyl group having the carbon number from 1 to 20, such as a methyl group, an ethyl group, an n-propyl group, an isopropyl group, an n-butyl group, a tert-butyl group, a sec-butyl group, an n-pentyl group, or an n-hexyl group; a straight-chain or branched alkenyl group having the carbon number from 1 to 20, such as a vinyl group, a propenyl group, a butenyl group, a pentenyl group, or a hexenyl group; a straight-chain or branched alkoxy group having the carbon number from 1 to 20 which may be substituted as appropriate, such as a methoxy group, an ethoxy group, an n-propoxy group, an isopropoxy group, an n-butoxy group, a tert-butoxy group, an ethoxycarbonylpropoxy group, a sec-butoxy group, an n-pentyloxy group, an n-hexyloxy group, or an n-heptyloxy group; a hydroxyalkyl group having the carbon number from 1 to 20, such as a hydroxymethyl group or a hydroxyethyl group; an aromatic ring or a heterocycle having the carbon number from 6 to 12, such as a benzene ring, a naphthalene ring, an anthracene ring, a thiophene ring, a furan ring, a pyrrole ring, a pyrazole ring, a pyridine ring, or a pyran ring; a carboxylalkyl group such as a carboxylmethyl group; a straight-chain or branched alkoxycarbonyl group having the carbon number from 2 to 21 which may be substituted as appropriate, such as a methoxycarbonyl group, a trifluoromethoxycarbonyl group, an ethoxycarbonyl group, an n-propoxycarbonyl group, an isopropoxycarbonyl group, an n-butoxycarbonyl group, a tert-butoxycarbonyl group, a sec-butoxycarbonyl group, an n-pentyloxycarbonyl group, or an n-hexyloxycarbonyl group; a straight-chain or branched alkylcarbonyloxy group having the carbon number from 2 to 21 which may be substituted as appropriate, such as a methylcarbonyloxy group, an ethylcarbonyloxy group, an n-propylcarbonyloxy group, an isopropylcarbonyloxy group, an n-butylcarbonyloxy group, a sec-butylcarbonyloxy group, a tert-butylcarbonyloxy group, or an n-pentylcarbonyloxy group; and a straight-chain or branched alkoxycarbonylalkyl group having the carbon number from 3 to 22, such as a methoxycarbonylmethyl group, a methoxycarbonylethyl group, an ethoxycarbonylmethyl group, an ethoxycarbonylethyl group, an n-propoxycarbonylethyl group, an n-propoxycarbonylpropyl group, an isopropoxycarbonylmethyl group, or an isopropoxycarbonylethyl group. Here, among $X^1$ to $X^8$ and $R^1$ to $R^4$, adjacent substituents may be bonded together to form a cyclic structure. In the general formula (1), M is any of: two hydrogen atoms; divalent metal such as Ni, Co, Cu, Zn, Pd, Pt, Fe, Mn, Sn, Mg, or Rh; and a derivative which can be coordinated to the porphycene compound, including, a trivalent or tetravalent metallic derivative such as TiO, FeCl, VO, or Sn $(Y)_2$, and a derivative of Si $(Y)_2$, Ge$(Y)_2$ or the like (where Y is any of a halogen atom, an alkyl group, an aryl group, a hydroxyl group, an alkoxy group, an aryloxy group, an alkylthio group, and an arylthio group). Among them, Ni, Zn, Co, and Cu are particularly preferred because of the absorption maximum in the range from 300 to 500 nm and a large molar extinction coefficient.

The annulene compound is expressed by the following general formula (2):

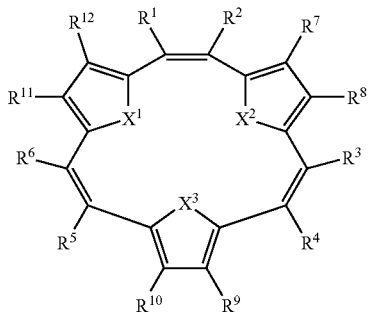

(formula 2)

In the general formula (2), each of $X^1$ to $X^3$ is independently any of: an oxygen atom; a sulfur atom; a selenium atom; and an imino group. In the general formula (2), each of $R^1$ to $R^6$ is independently any of: a hydrogen atom; a halogen atom; a hydroxyl group; a carboxyl group; a straight-chain or branched alkoxycarbonyl group having the carbon number from 2 to 21 which may be substituted as appropriate, such as a methoxycarbonyl group, a trifluoromethoxycarbonyl group, an ethoxycarbonyl group, an n-propoxycarbonyl group, an isopropoxycarbonyl group, an n-butoxycarbonyl group, a tert-butoxycarbonyl group, a sec-butoxycarbonyl group, an n-pentyloxycarbonyl group, or an n-hexyloxycarbonyl group; and a straight-chain or branched alkyl group having the carbon number from 1 to 20, such as a methyl group, an ethyl group, an n-propyl group, an isopropyl group, an n-butyl group, a tert-butyl group, a sec-butyl group, an n-pentyl group, or an n-hexyl group.

In the general formula (2), each of $R^7$ to $R^{12}$ is independently any of: a hydrogen atom; a halogen atom; a hydroxyl group; a formyl group; a carboxyl group; a cyano group; a nitro group; an amino group; a sulfonate group; a straight-chain or branched alkyl group having the carbon number from 1 to 20, such as a methyl group, an ethyl group, an n-propyl group, an isopropyl group, an n-butyl group, a tert-butyl group, a sec-butyl group, an n-pentyl group, or an n-hexyl group; a straight-chain or branched alkenyl group having the carbon number from 1 to 20, such as a vinyl group, a propenyl group, a butenyl group, a pentenyl group, or a hexenyl group; a straight-chain or branched alkoxy group having the carbon number from 1 to 20 which may be substituted as appropriate, such as a methoxy group, an ethoxy group, an n-propoxy group, an isopropoxy group, an n-butoxy group, a tert-butoxy group, an ethoxycarbonylpropoxy group, a sec-butoxy group, an n-pentyloxy group, an n-hexyloxy group, or a heptyloxy group; a hydroxyalkyl group having the carbon number from 1 to 20, such as a hydroxymethyl group or a hydroxyethyl group; an aromatic ring or a heterocycle having the carbon number from 6 to 12, such as a benzene ring, a naphthalene ring, an anthracene ring, a thiophene ring, a furan ring, a pyrrole ring, a pyrazole ring, a pyridine ring, or a pyran ring; a carboxylalkyl group such as a carboxylmethyl group; a straight-chain or branched alkoxycarbonyl group having the carbon number from 2 to 21 which may be substituted as appropriate, such as a methoxycarbonyl group, a trifluoromethoxycarbonyl group, an ethoxycarbonyl group, an n-propoxycarbonyl group, an isopropoxycarbonyl group, an n-butoxycarbonyl group, a tert-butoxycarbonyl group, a sec-butoxycarbonyl group, an n-pentyloxycarbonyl group, or an n-hexyloxycarbonyl group; a straight-chain or branched alkylcarbonyloxy group having the carbon number from 2 to 21 which may be substituted as appropriate, such as a methylcarbonyloxy group, an ethylcarbonyloxy group, an n-propylcarbonyloxy group, an isopropylcarbonyloxy group, an n-butylcarbonyloxy group, a sec-butylcarbonyloxy group, a tert-butylcarbonyloxy group, or an n-pentylcarbonyloxy group; and a straight-chain or branched alkoxycarbonylalkyl group having the carbon number from 3 to 22, such as a methoxycarbonylmethyl group, a methoxycarbonylethyl group, an ethoxycarbonylmethyl group, an ethoxycarbonylethyl group, an n-propoxycarbonylethyl group, an n-propoxycarbonylpropyl group, an isopropoxycarbonylmethyl group, or an isopropoxycarbonylethyl group.

Here, among $R^1$ to $R^{12}$, adjacent substituents may be bonded together to form a cyclic structure.

The recording layer can be formed by coating the above-described organic dyes on a transparent resin substrate either directly or through another layer in accordance with an appropriate coating method such as a casting method, a spin-coating method, or a dipping method. A solvent to be used in the coating method is not particularly limited as long as the solvent does not corrode the substrate. For example, the solvent may be any of: a ketone alcohol solvent such as diacetone alcohol or 3-hydroxy-2-butanone; a cellosolve solvent such as methylcellosolve or ethylcellosolve; a hydrocarbon solvent such as n-hexane or n-heptane; a perfluoroalkyl alcohol solvent such as tetrafluoropropanol, octafluoropentanol, or hexafluorobutanol; a hydrocarbon solvent such as cyclohexane, methylcyclohexane, ethylcyclohexane, dimethylcyclohexane, n-butylcyclohaxane, t-butylcyclohexane, or cyclooctane; an ether solvent such as diisopropyl ether or dibutyl ether; and a hydroxyl ester solvent such as methyl lactate, ethyl lactate, or methyl isobutyrate.

The film thickness of the recording layer is appropriately selected in response to a wavelength, an optical constant of a light reflective layer, and a material of a light absorption layer in consideration of a coefficient of performance of recording sensitivity to power of recording light such as a laser beam which is used for recording. Moreover, as described above, in order to record the disk-specific identification information on the land track by use of the irreversible record mark, the land portion must be recordable as well. However, the film thickness of the recording layer of the dye coating-type optical disk formed by the spin-coating method becomes thicker in the groove portion which is recessed, and becomes thinner in the land portion when viewed from a coating surface. Therefore, when the wavelength of the laser beam is $\lambda$, the film thickness of the recording layer at the land portion needs to be $\lambda/6$ nm or above. Meanwhile, it is necessary to select the dye and the solvent for dissolving the dye properly, or optimize a U-shaped groove formed on the substrate, so that the film thickness of the recording layer at the land portion satisfies the above-mentioned condition. In addition, a recording/playback characteristic must be superior in the whole area of the optical disk to the land portions. Accordingly, the optical constant of the dye needs to be 1.8 or greater. Therefore, the depth of the U-shaped groove of the groove portion needs to be in the range from 20 nm to 150 nm, or more preferably from 50 nm to 120 nm.

In the meantime, the reflective layer may be made of metal such as Au, Ag, Cu or Al, or an alloy mainly composed of the above-mentioned metal. Among them, Ag or an alloy mainly composed of Ag is preferred in terms of reflectance and durability. A method of forming the reflective layer includes vacuum deposition, sputtering, ion plating, and the like. It is preferable to adjust the film thickness of the reflective layer to be in the range from 0.02 µm to 0.5 µm in consideration of reflectance, thermal diffusion efficiency, and the like.

It is preferable to use a rigid material such as acrylic ultraviolet curable resin as a protective layer to be formed on the reflective layer. By using such a material, it is possible to prevent deformation of the protective layer with time when the optical disk is preserved in a hot and humid environment for a long period. The protective layer is normally formed by coating the ultraviolet curable resin on the reflective layer either directly or through another layer to get to the thickness from 1 µm to 20 µm according to the spin-coating method, and then by curing the resin with ultraviolet irradiation.

EXAMPLE 1

Figure 2:
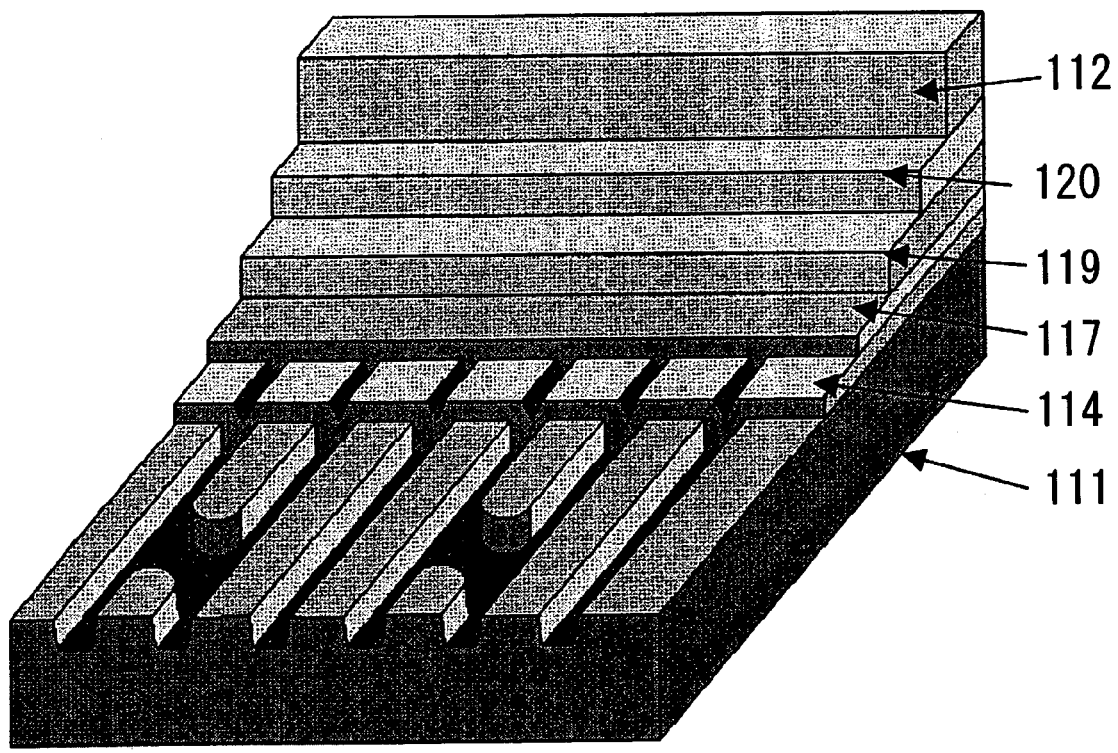
FIG. 2 is a view showing a structure of a dye coating type optical disk according to the present invention.

FIG. 2 is a view showing a structure of a dye coating-type optical disk according to the present invention. FIG. 2 shows a cross-sectional structure of a write-once optical disk. In the write-once optical disk shown in FIG. 2, concavo-convex pits including address information (ID) and the like, and 0.45 µm-pitch U-shaped grooves are formed in advance on a surface of a substrate 111 made of polycarbonate resin having a diameter of 120 mm and a thickness of 0.6 mm. Each U-shaped groove has a width of about 0.20 µm and a depth of 100 nm. A recording layer 114 formed on this substrate 111 adopts a porphycene dye as a dye material, which is shown in the following general formula (3). This 0.5 g dye was dissolved in 40 g of tetrafluoropropanol, and this solution was subjected to ultrasonic dispersion at 40° C. for 30 minutes and then filtrated with a 0.2-µm filter. The dye solution thus prepared was spin-coated on the substrate 111 while accelerating the rotation speed from 500 rpm to 2000 rpm, and the recording layer 114 was thereby formed. Next, the substrate 111 coated with the recording layer 114 was dried for 30 minutes in an oven at 80° C., and then an Ag alloy film was formed in a thickness of 100 nm on the recording layer 114 by the sputtering method, and a reflective layer 117 was thereby formed. Moreover, ultraviolet curable resin 119 was spin-coated in a thickness of 5 µm on this reflective layer 117 and then cured by ultraviolet irradiation, and a recording layer-coated substrate was thereby prepared. Furthermore, a slow-acting ultraviolet curing adhesive 120 was coated and a dummy substrate 112 was attached thereto, thereby preparing the optical disk. Here, it is possible to attach the dummy substrate 112 directly by use of the ultraviolet curing adhesive without forming the ultraviolet curable resin 119 on the reflective layer 117.

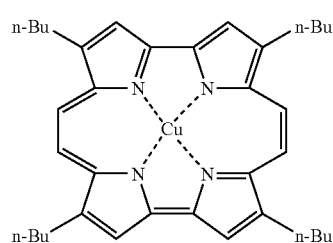

(formula 3)

Regarding the dye coating type optical disk shown in FIG. 2, a schematic diagram of part of a given region recording the disk-specific identification information and a cross section thereof taken along the track direction, and a schematic diagram of a signal waveform played back while tracking on the groove track are similar to those shown in FIG. 1.

Figure 7:
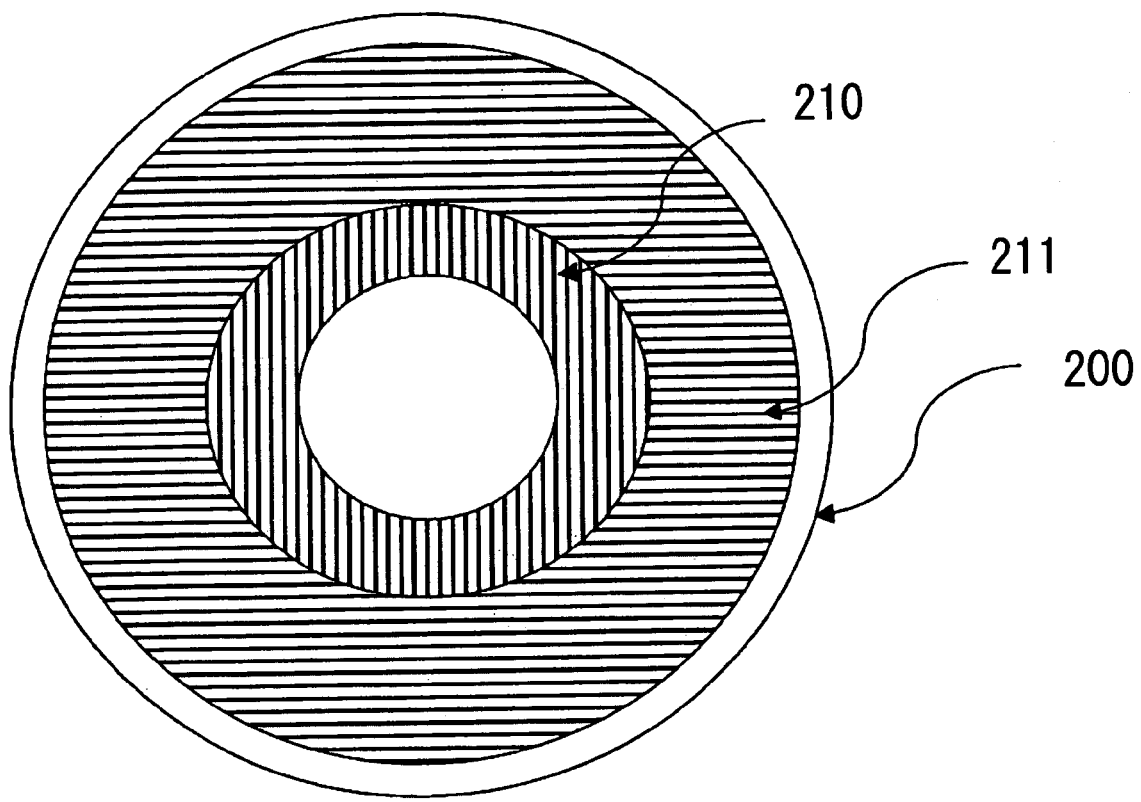
FIG. 7 is a schematic diagram of a layout of an optical disk of the present invention.

FIG. 7 is a schematic diagram of a layout of an optical disk of the present invention. FIG. 7 shows a track layout of a recordable optical disk prior to recording. A lead-in region 210 of an optical disk 200 shown in the drawing is a region for recording information concerning the recordable optical disk. The lead-in region 210 is provided in the inner periphery in FIG. 7. However, the lead-in region 210 may be provided in the outer periphery instead. The information to be recorded in the lead-in region 210 is information necessary for recording and playing back information in a region 211 when accessing the optical disk 200 and arrangement of the information is not usually limited.

In the optical disk of this embodiment, the grooves for recording the information are formed spirally or coaxially within a range from the inner periphery to the outer periphery. Moreover, the disk-specific identification information is recorded on a land track including a mirror region formed on part of lands (L) in a given range of the inner peripheral side of the disk, for example, by use of a dedicated servo writer. As shown in FIG. 1, the disk-specific identification information is recorded such that the irreversible record marks illustrated in black and unrecorded regions illustrated in white are alternately arranged. Here, although user information (contents data) and the like are not shown in FIG. 1, they are recorded on the grooves in other regions.

Signal amplitude in a signal mark position on the land track is smaller than signal amplitude in a signal mark position in the mirror region. Accordingly, a region having a higher signal level than a land level is formed by not recording in the vicinity of a boundary from a trailing edge of the land track to a leading edge of the mirror region. Here, it is also possible to use the above-described portion as a synchronization signal for a mark to indicate the position where the disk-specific identification information is recorded.

A signal level in the mirror region becomes higher than that of the land track. Moreover, a groove width is increased in the record mark position formed in the mirror region more than a groove width in a normal groove track portion. Accordingly, it is possible to secure a sufficient width for the record mark, and to obtain sufficient signal amplitude for detecting the signal accurately upon playback while tracking on the groove track. It is also possible to further improve detection accuracy by setting recording density in the track direction of the mirror region lower than that of the user data region.

As shown in FIG. 1, by providing the pits to be formed on the dye film on the track on both of the groove and the land, when the disk-specific identification information is recorded on the optical disk, it is possible to obtain three types of playback signals which are mutually distinguishable upon playback of the pits. In FIG. 1, the playback signal obtained from a pit mark recorded on the groove or the land is indicated by (b), the playback signal from a pit mark recorded in the mirror region having the larger width than the groove width is indicated by (c), and the playback signal from a portion in the mirror region without a pit mark is indicated by (a). As shown in FIG. 1, the sizes of the playback signals are in the order of (a)>(b)>(c).

When the information is recorded on the dye coating-type optical disk, the recording pit marks are usually formed on the grooves, that is, inside the grooves. In this embodiment, the disk-specific identification information is recorded in a specified region provided in the optical disk so as to distinguish the disk-specific identification information from the signals recorded in the ordinary region. Specifically, this embodiment utilizes the phenomenon that a larger playback signal is obtained in the mirror region as compared to the recording pit mark in the groove or on the land because high reflectance is obtained in the mirror region. Moreover, in combination with the record in the groove or on the land, it is possible to record the disk-specific identification signal having the plurality of playback signal levels. By combining means for providing the mirror region disposed in the optical disk as a special position on the specified disk with means for invalidating the record per se in other positions in the optical disk, it is possible to clearly distinguish an optical disk without the provision of the mirror region and an optical disk which does not record the disk-specific identification information in the specified position. An address for designating the position of the mirror region complies with address information which is recorded at the time of mastering, and this address is not linked to address information to be recorded thereafter. The address for the mirror region can be recorded in combination with the disk-specific identification information so as to be recognized on a system. Since the disk-specific identification information is linked to a physical address formed by mastering, it is possible to invalidate the disk-specific identification information recorded in a position deviated from the specified position for the purpose of falsifying this disk-specific identification information.

Next, a method of managing the disk-specific identification signal in the playback signal will be described. As shown in FIG. 1, description has been made on the phenomenon that the three types of effective signals were obtained by recording the disk-specific identification information in the recording position which covers from the groove or land portion to the mirror region. The method of detecting the disk-specific identification information from these three types of signals will now be described.

Figure 8:
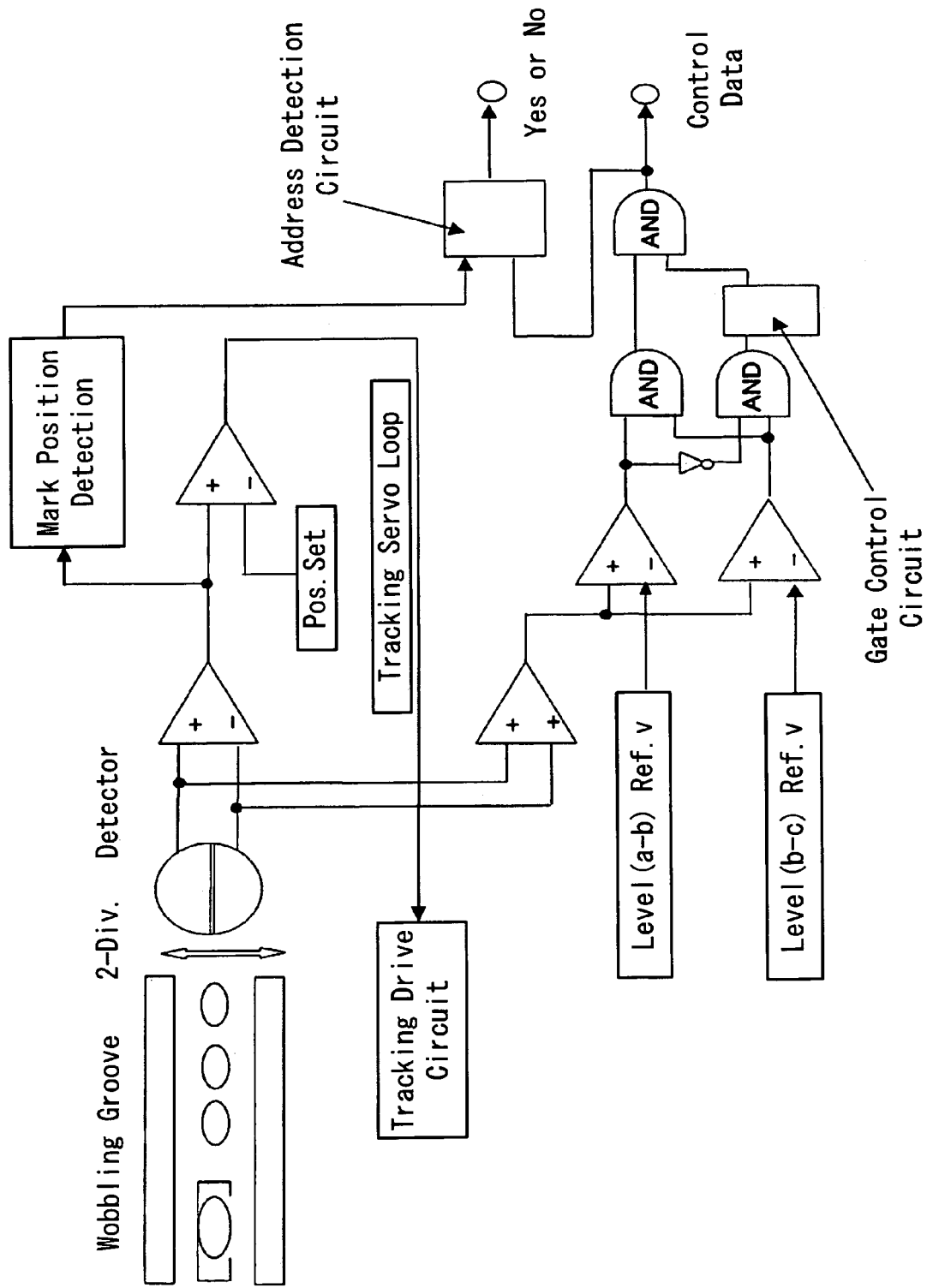
FIG. 8 is a schematic diagram of a signal detection circuit according to the present invention.

FIG. 8 is a view for explaining a signal detection circuit according to the present invention. An optical head of an optical disk drive applies a photodetector which is split in two ways with respect to a perpendicular direction to the track for the tracking purpose. By applying the two-way split photodetector, it is possible to detect a push-pull signal which is obtained from the groove or the land by use of primary diffracted light, thereby tracking the recording track. The two-way split photodetector operates as a tracking servo sensor by obtaining a differential signal between split detectors. Moreover, the two-way split photodetector can detect the pit mark by obtaining a sum signal of the split photodetectors. The playback signal obtained as described above includes the three types of signals. In order to discriminate these signals, a standard voltage is set between the (a) level and the (b) level, and another standard voltage is set between the (b) level and the (c) level. The playback signal thus detected is converted into a binary value with a comparator. Here, the (a) to (b) standard voltages need to be set within a voltage range shown in FIG. 1 so as to detect the pit mark at the groove or land portion.

In FIG. 8, an output signal from a comparator is inputted to an AND gate circuit. This is selection processing for identifying the pit mark of the groove or land portion and the pit mark in the mirror region and thereby extracting the disk-specific identification information. The signal detected at the level (1) in FIG. 1 functions as the synchronization signal disposed before and after recording the disk-specific identification information. FIG. 8 shows an aspect of a simple operation example, in which a gate signal as the disk-specific identification information is generated and extracted at the level (1). This gate-processed signal can be extracted as the disk-specific identification information or as control data.

To clarify a relation with the recording position of the disk-specific identification information, it is necessary to assume that the disk-specific identification information is played back considering the pit mark disposed on the left or right side of a traveling direction of the two-way split photodetector placed in the tracking state in the case of playback at the groove or land portion. When polarity is discriminated by use of the differential signal of the two-way split photodetector and a relation between the polarity and the playback address information is judged, it is possible to perform authenticity judgment.

It is to be noted that this judgment is not an essential process in the method of detecting the disk-specific identification information obtained by the above-described gate process, but is merely an additional process.

Figure 9:
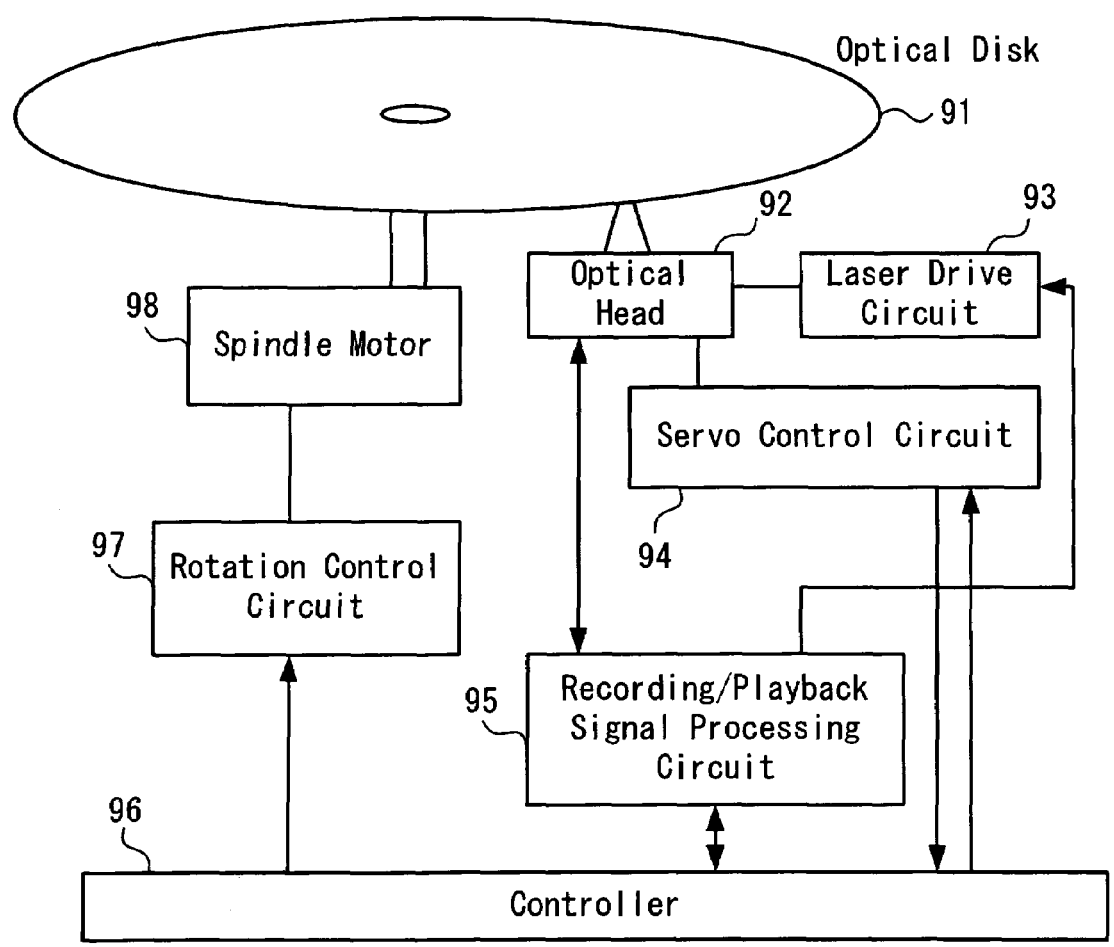
FIG. 9 is a schematic diagram of an optical disk drive of the present invention.

FIG. 9 is a view showing one example of the optical disk drive. An optical disk drive 90 shown in FIG. 9 includes an optical disk 91, an optical head 92, a laser drive circuit 93, a servo control circuit 94, a recording/playback signal processing circuit 95, a controller (information management) 96, a rotation control circuit 97, and a spindle motor 98. The playback signal from the optical head 92 and a detection signal from the servo control circuit 94 are inputted to the recording/playback signal processing circuit 95.

When the optical disk drive 90 judges the optical disk 91 as an unauthorized copy based on a result of the authenticity judgment, the optical disk drive 90 executes any of the following operations of displaying an alarm on a display screen, stopping access to the optical disk 91, or discharging the optical disk 91.

EXAMPLE 2

Figure 3:
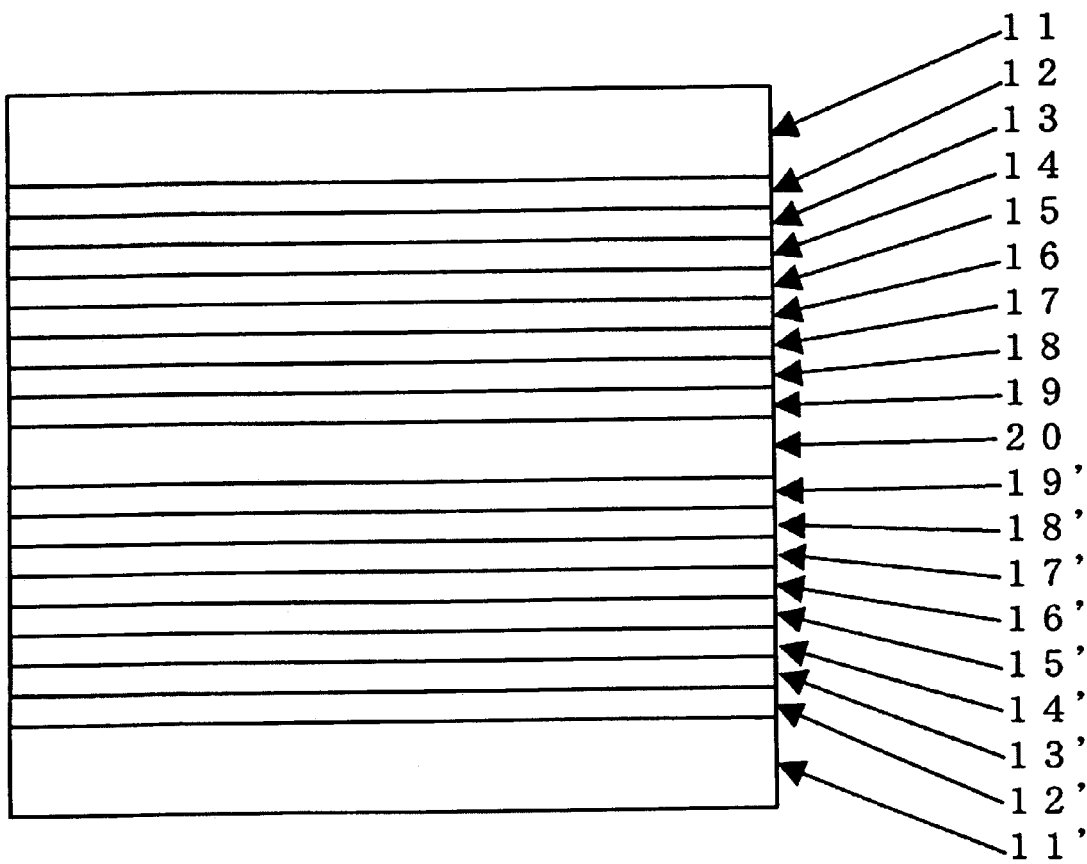
FIG. 3 is a view showing a structure of a phase-change optical disk according to the present invention.

FIG. 3 is a view for explaining a structure of a phase-change optical disk according to the present invention.

A substrate 11 was prepared by forming concavo-convex pits including the address information and the like and forming 0.68 μm-pitch U-shaped grooves in advance on a surface of a polycarbonate resin plate having a diameter of 120 mm and a thickness of 0.6 mm. The width and intervals (the lands) of the U-shaped grooves were set substantially equal to about 0.34 μm. Pattern A in FIG. 6 was used as the arrangement pattern of the mirror regions. Here, it is also possible to use Pattern B instead.

Figure 6:
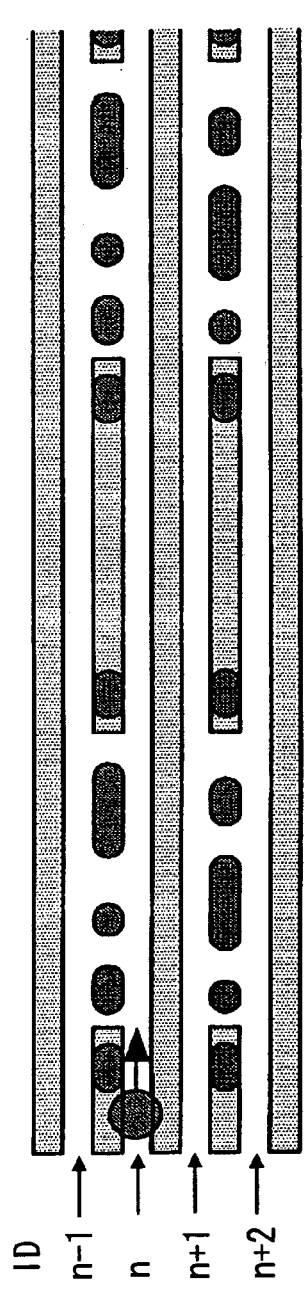
FIG. 6 is a view for explaining format examples of a recording region for disk-specific identification information according to the present invention.
Figure 6:
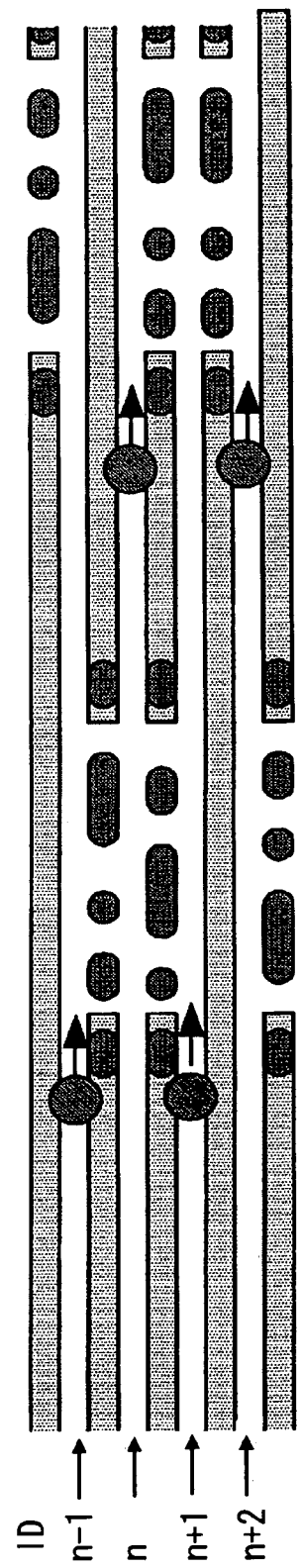
Figure 10:
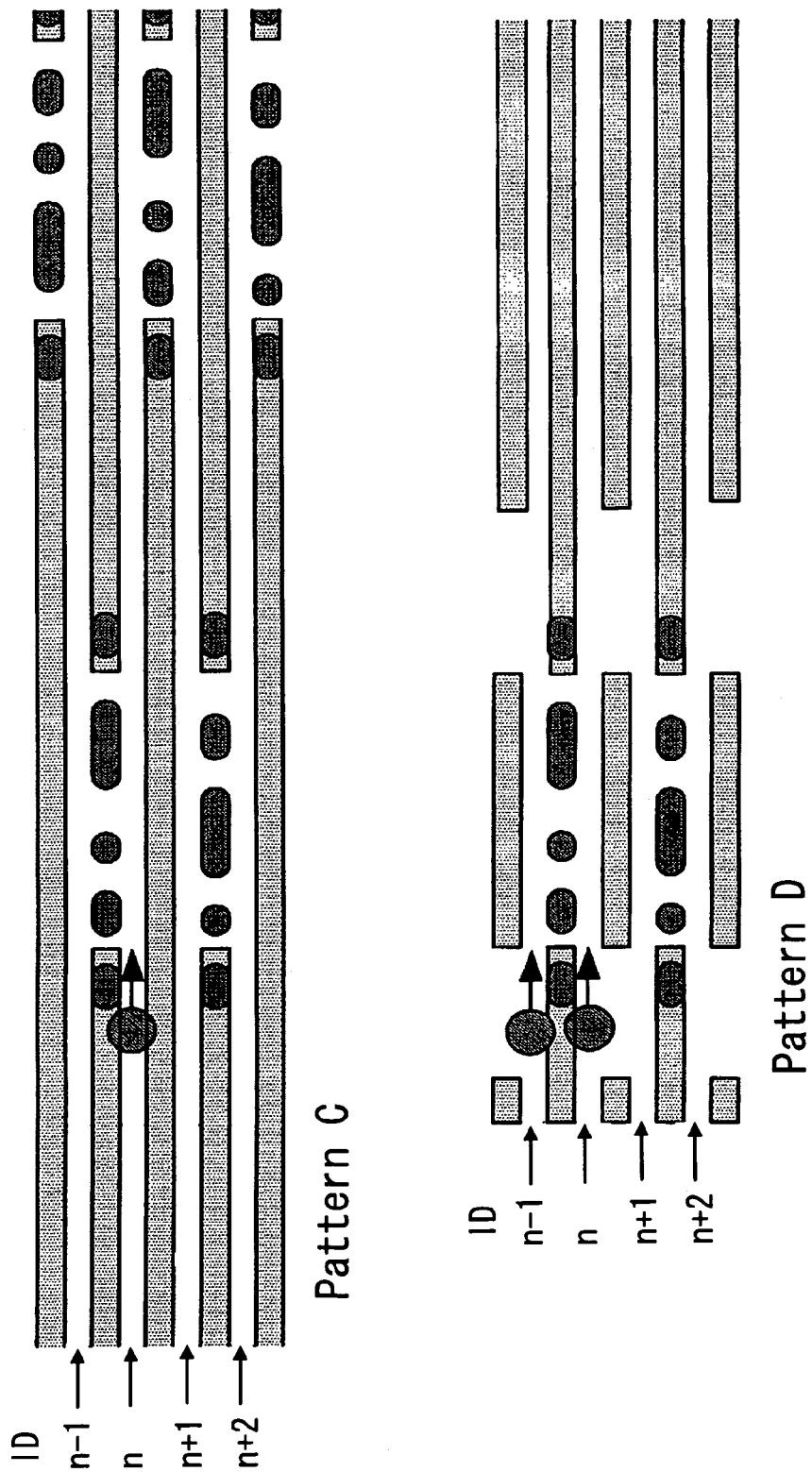
FIG. 10 is a view showing format examples of the recording region for the disk-specific identification information according to the present invention.
Figure 11:
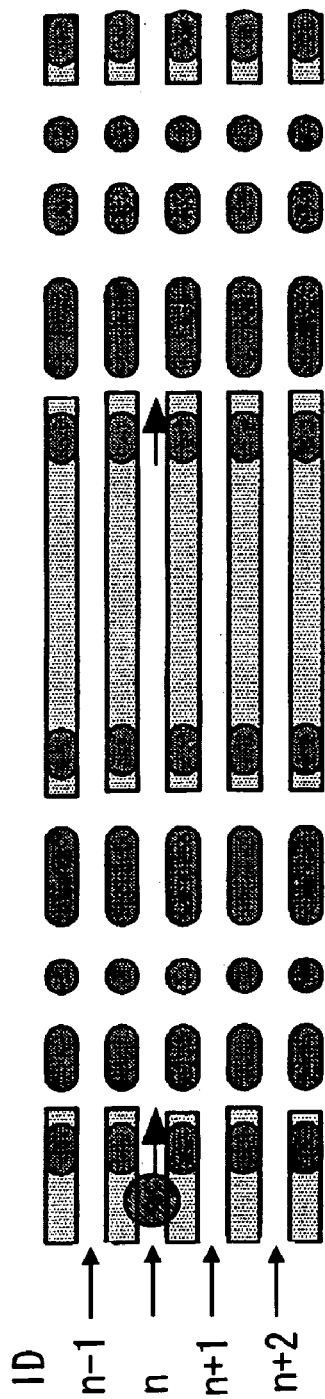
FIG. 11 is a view showing other format examples of the recording region for the disk-specific identification information according to the present invention.
Figure 11:
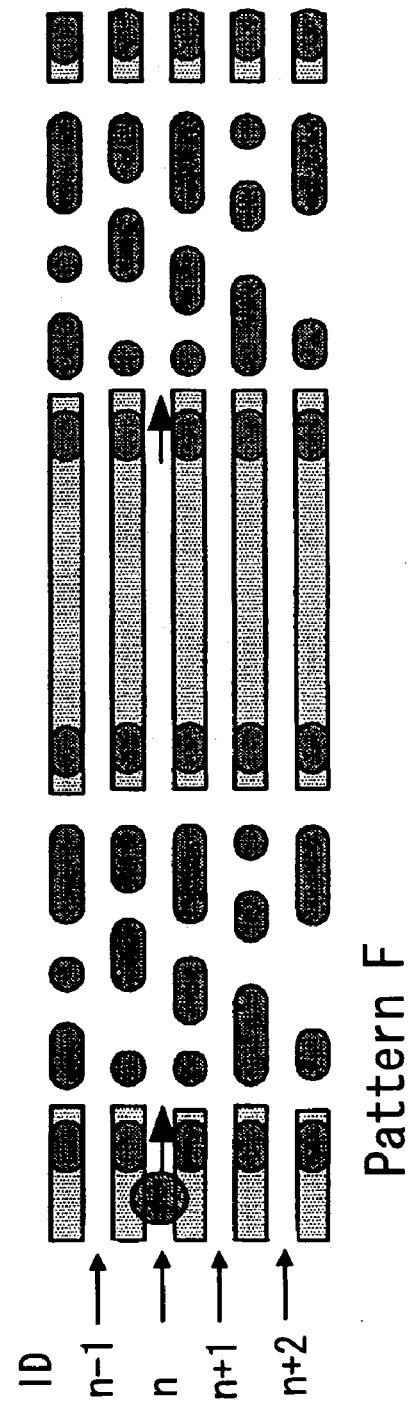

FIG. 6 is a view for explaining examples of format patterns for the disk-specific identification information. In Pattern A, the disk-specific identification information is generated by a signal played back from groove track ID (n). In Pattern B, the disk-specific identification information is generated by signals played back from groove tracks ID (n−1) and ID(n+1). Moreover, the disk-specific identification information is generated by signals played back from groove tracks ID (n) and ID (n+2). Similarly, it is also possible to use Pattern C or Pattern D shown in FIG. 10. Alternatively, it is possible to use arrangement patterns for the mirror region shown in FIG. 11. In Pattern E shown in FIG. 11, the disk-specific identification information is recorded in a plurality of mirror regions disposed so as to align in the radial direction of the optical disk to match the signals which are played back from a plurality of IDs (ID(n−1) to ID (n+m)). Moreover, in Pattern F, it is possible to perform multilevel playback by the addition of crosstalk when clocks are synchronized between adjacent mirror regions and the disk-specific identification information is recorded as different record marks. In this case, it is also possible to record and calculate the disk-specific identification information as PPM marks instead of PWN marks.

This substrate 11 was disposed in a first sputtering chamber of a sputtering system which includes a plurality of sputtering chambers and has excellent uniformity and repeatability in the film thickness. Using a mixture of ZnS and SiO$_2$ as a target, a (ZnS)$_{80}$(SiO$_2$)$_{20}$ (mol %) first dielectric layer 12 with a thickness of 55 nm was formed in argon gas. Subsequently, this substrate 11 was moved to a second sputtering chamber, and a GeCrN second dielectric layer 13 with a thickness of 2 nm was formed in argon-nitrogen mixed gas having the nitrogen content of 50 mol % by use of Ge$_{80}$Cr$_{20}$ as a target.

Thereafter, this substrate 11 was moved to a third sputtering chamber, and a recording layer 14 with a thickness of 10 nm was formed in argon gas by use of a Ge$_{33}$Sb$_{13}$Te$_{54}$ (atom %) sintered body as a target. Subsequently, the substrate 11 was moved to a fourth sputtering chamber, and a GeCrN interface layer 15 with a thickness of 2 nm was formed in argon-nitrogen mixed gas having the nitrogen content of 50 mol % by use of a Ge$_{80}$Cr$_{20}$ target.

Then, the substrate 11 was moved to a fifth sputtering chamber, and a (ZnS)$_{60}$(SiO$_2$)$_{40}$ (mol %) intermediate layer 16 with a thickness of 38 nm was formed by use of a mixture of ZnS and SiO$_2$ as a target. Subsequently, an Al$_{99}$Ti$_1$ first reflective layer 17 with a thickness of 50 nm was formed in a sixth sputtering chamber by use of an Al$_{99}$Ti$_1$ (atom %) alloy as a target. Finally, an Ag$_{97}$Ru$_2$Au$_1$ second reflective layer 18 with a thickness of 50 nm was formed in a seventh sputtering chamber by use of Ag$_{97}$Ru$_2$Au$_1$ (atom %) as a target. The laminated substrate 11 was taken out of the sputtering system and an ultraviolet curable resin protective layer 19 was formed on the outermost layer by spin-coating.

Similarly, a (ZnS)$_{80}$(SiO$_2$)$_{20}$ (mol %) first dielectric layer 12', a GeCrN second dielectric layer 13', a recording layer 14', a GeCrN interface layer 15', a (ZnS)$_{60}$(SiO$_2$)$_{40}$ (mol %) intermediate layer 16', an Al$_{99}$Ti$_1$ first reflective layer 17', an Ag$_{97}$Ru$_2$Au$_1$ second reflective layer 18', and an ultraviolet curable resin protective layer 19' were formed on another similar substrate 11'. The ultraviolet curable resin protective layers 19 and 19' of these two substrates were opposed and then attached to each other with an adhesive layer 20, and a phase-change optical disk 21 was thereby formed.

Next, this phase-change optical disk 21 was subjected to initialization by use of an initialization device. Then, using a recording/playback device having a recording laser wavelength ($\lambda$) of 405 nm and a pickup with an objective lens (NA) 0.65, the disk-specific identification information was recorded under irreversible conditions, which were set to a recording line speed of 3 m/s and recording power of 10 mW, in a region having a radius from 21.5 mm to 21.7 mm in a specified track position on the land track where part of the land was cut off as shown in FIG. 4. Here, the disk-specific identification information was formed as the irreversible record marks. Conditions for recording the user data were set to a recording/playback line speed of 5.7 m/s and recording power of 5 mW. Here, it is possible to overwrite the information by setting the recording power to 5 mW and bias power to 2 mW, and by irradiating a laser beam modulated between the recording power and the bias power.

When this phase-change optical disk was played back while tracking on the groove track, the playback signal waveform as shown in FIG. 4 was obtained in a position adjacent to the land track including the mirror region. Here, a data volume necessary for the disk-specific identification information is in a range from several bytes to several tens of bytes, and a necessary length in the track direction of the mirror region is in a range from several micrometers to several tens of micrometers. Accordingly, tracking will not be deviated even if part of the land track is cut off in the track direction.

To investigate the conditions for forming the irreversible record mark in detail, another irreversible mark was formed on the optical disk used in Example 1 while changing the line speed and the recording power. As a result, when the recording line speed for the irreversible mark was smaller than 0.25-fold of the normal recording line speed at 5.7 m/s, it was possible to record the irreversible mark but the amplitude thereof was smaller than the normally recorded mark. This is attributable to the fact that a material capable of crystallization at the line speed of 5.7 m/s is used as a recording film and a recrystallization region of the recording layer is increased when the recording line speed is too slow. Therefore, it is preferable to set the recording line speed for the irreversible mark to a value equal to or greater than 0.25-fold of the normal recording line speed. It is possible to form the irreversible mark even when the recording line speed for the irreversible mark is equal to the normal recording line speed. However, in this case, the recorded mark turned into the irreversible mark when the recording power was set to a value smaller than twice of the power used for normal recording.

As a result of investigation on the relation between the recording line speed Va and the recording power Pa (mW) for forming the irreversible mark more in detail, formation of the irreversible mark was normally achieved when Va was set to 0.25-fold to 1-fold of the normal recording line speed V and the recording power Pa (mW) was set to Pa>2×P× (Va/V)$^{1/2}$. At the same time, the signal amplitude of the irreversible mark reached 1.3-fold or greater of the signal amplitude of the normal record mark. Outside the above-mentioned range, a reversible mark was formed or the irreversible mark was formed but in smaller amplitude. Moreover, when the recording power Pa was set to Pa>2.5× P×(Va/V)$^{1/2}$, the signal amplitude of the irreversible mark reached 1.4-fold or greater of the signal amplitude of the normal record mark.

Although this example has been described on the case of using both of the land and the groove as the recording track, similar results were obtained in the case of using any one of the land or the groove as the recording track. In this case, the irreversible mark may be formed only on the recording track, or alternatively on both the recording track and a space between the recording tracks as well.

EXAMPLE 3

Example 2 has described the case of irreversibly recording the disk-specific identification information in the information management region under the irreversible conditions in the land/groove recording while providing the recording track on both of the land and the groove. Now, another example of the phase-change optical disk will be described on the case of providing the recording track only on the groove.

The phase-change recording films identical to Example 2 were laminated in the reverse order on a substrate with a thickness of 1.1 mm, which was provided with grooves meandering in a constant cycle and address information recorded thereon in an overlapping manner. In addition, a cover layer with a thickness of 0.1 mm was formed thereon to fabricate an optical disk. As similar to Example 2, the recording films on this optical disk were subjected to initialization with an initialization device. The initialized optical disk was subjected to recording in the management information region by use of a recording/playback device having a recording laser wavelength ($\lambda$) of 405 nm and a pickup with an objective lens (NA) 0.85. Here, main data were recorded under conditions of recording line speed at 2.5 m/s, the bias power (Pb) at 0.5 mW, and normal recording power (Pw1) at 2.0 mW. Meanwhile, the address information, the SYNC code, and the error detection code (EDC) were recorded under conditions of irreversible recording power (Pw2) at 10 mW and a standard clock (T) at 33 MHz. In this way, the address information (ID), the SYNC code, and the error detection code (EDC) were formed as the irreversible marks. When this optical disk was played back under conditions of a line speed at 6 m/s and playback power (Pr) at 0.5 mW, a degree of signal modulation was 60% at a normally recorded portion and 75% at an irreversibly recorded portion.

Next, the information was overwritten in the above-described management information region under conditions of the line speed at 5.0 m/s, the bias power (Pb) at 2.0 mW, and normal recording power (Pw0) at 5.0 mW. Thereafter, the optical disk was played back using the playback power (Pr) at 0.5 mW. Since the SYNC code has a different pattern depending on the precedent information, it is not possible to delete the portion where the SYNC code is recorded. Accordingly, a record mark is formed continuously with the SYNC code at a portion of the SYNC frame which is supposed to be written into a space. Therefore, a playback signal length of the SYNC code is extended in this portion unlike a modulation pattern. By detecting such a change in the playback signal length, it is possible to detect overwriting (falsification) of the management information. Particularly, when a different recording device is applied, each device has different stability in terms of servo system control of the spindle and record start timing of the SYNC code is therefore shifted. As a result, the change in the playback signal length becomes even greater.

Meanwhile, error detection code (EDC) data are determined by a computational result of the main data. Accordingly, it is also possible to detect overwriting (falsification) of the management information by use of different error detection code (ED) data which are changed by overwriting.

In this example, all the address information (ID), the SYNC code, and the error detection code (EDC) were irreversibly recorded. However, it is also possible to perform irreversible recording of part or a combination of the above-mentioned data. By forming only the disk-specific identification information in the management information region into the irreversible record mark 12 as described above, the burden on the recording laser is reduced as compared to the case of forming all the management information into the irreversible marks.

According to the present invention, the disk-specific identification information is recorded in the form of irreversible marks on a groove or a land provided with a plurality of flat portions (the mirror regions). In the meantime, this disk-specific identification information is read out in the state while tracking on the recording track adjacent to the groove or the land. In this way, it is possible to obtain three or more types of signal levels including a level which cannot be detected at a detection level applied when recorded on the normal recording track. As a result, the present invention provides an optical disk which cannot be copied illegally and a method of playing such an optical disk.

Moreover, the information to be recorded in a specified position as the specific information, such as the address information (ID), the SYNC code, or the error detection code (EDC), are formed into the irreversible marks. Accordingly, it is possible to easily detect overwriting (falsification) of the information. In addition, application of the management information region is effective for preventing falsification of the management information.

What is claimed is:

1. An optical disk comprising:
   a groove and a land formed on a substrate, the groove including a groovetrack and the land including a landtrack;
   a recording region formed on the substrate for recording user data; and
   a management region formed on the substrate and provided outside the recording region including an identification information region for recording disk-specific identification information,
   wherein the management region has a flat portion formed by sectioning part of at least one of the groove and the land, and
   wherein the disk-specific identification information is recorded as an irreversible record mark on the flat portion adjacent to a recording track and at least one of the groovetrack and the landtrack.

2. The optical disk according to claim 1,
   wherein the flat portion forms a plane having the same height as at least one of the groove adjacent to the land and the land adjacent to the groove.

3. The optical disk according to claim 1,
   wherein the flat portion has a width in a perpendicular direction to a track direction which is wider in a radial direction than a width of at least one of the groove and the land.

4. The optical disk according to claim 1,
   wherein the disk-specific identification information includes any one selected from the group consisting of address information, a SYNC code, and an error detection code.

5. The optical disk according to claim 1,
   wherein medium type information is recorded in the management region.

6. The optical disk according to claim 5,
   wherein the medium type information includes any one selected from the group consisting of a disk type, a reflectance, a position of the recording track, a recording layer material, a playback power, and a recording polarity.

7. The optical disk according to claim 1,
   wherein three different states of signal levels detecting a signal in the management region are mixed in an amplitude fluctuation,
   wherein the three different states are a signal level of the flat portion,
   a signal level of the disk-specific identification information recorded as the irreversible record mark on the flat portion, and
   a signal level of the disk-specific identification information recorded as the irreversible record mark on the at least one of the groovetrack and the landtrack other than the flat portion.

8. A method of playing an optical disk formed by providing a recording region for recording user data and a management region having an identification information region for recording disk-specific identification information on a substrate, the method comprising the steps of:

focusing a laser beam from a light source on the optical disk;

servoing the focused laser beam on at least one of a groove and a land, the groove including a groovetrack and the land including a landtrack;

detecting a signal in the management region and a signal of the disk-specific identification information by use of the laser beam being servoed on; and detecting a change in a signal level of the detected disk-specific identification information based on a predetermined threshold level, wherein the management region has a flat portion formed by sectioning part of at least one of the groove and the land in a given step, wherein the disk-specific identification information is recorded as an irreversible record mark on the flat portion adjacent to a recording track and at least one of the groovetrack and the landtrack, and the focused laser beam is servoed on the recording track adjacent to at least one of the groovetrack and the landtrack recorded the disk-specific identification information as the irreversible record mark, and wherein the disk-specific identification information is detected as an information signal by crosstalk from at least one of the groovetrack and the landtrack during playback.

9. The method of playing an optical disk according to claim 8, wherein the threshold level is respectively set between each of a signal level of the flat portion and a signal level of the disk-specific identification information, and a signal level of the disk-specific identification information recorded on the at least one of the groovetrack and the landtrack other than the flat portion, and wherein the disk specific identification information is recorded as the irreversible record mark.

10. The method of playing an optical disk according to claim 8, wherein the threshold level is set based on medium type information recorded in advance.

11. The method of playing an optical disk according to claim 9, wherein a signal of the disk-specific identification information recorded on the at least one of the groove and the land other than the flat portion is used as a synchronization signal, and authenticity of the disk-specific identification information is judged, wherein the disk-specific identification information is recorded as the irreversible record mark.

12. The method of playing an optical disk according to claim 9, wherein three different states of signal levels detecting the signal in the management region are mixed in an amplitude fluctuation, wherein the three different states are a signal level of the flat portion, a signal level of the disk-specific identification information recorded as the irreversible record mark on the flat portion, and a signal level of the disk-specific identification information recorded as the irreversible record mark on the at least one of a groovetrack and a landtrack other than the flat portion.

13. An optical disk drive including an optical head for focusing a laser beam on an optical disk, a playback signal processing circuit for processing a signal detected from the optical disk, a controller, a servo control circuit, and a spindle motor, the playback signal processing circuit comprising:

a circuit for detecting a change in a signal level of disk-specific identification information recorded on the optical disk based on a predetermined threshold level; and a circuit for judging authenticity of the disk-specific identification information, wherein the optical disk has a recording region formed on a substrate for recording user data and a management region formed on the substrate and provided outside the recording region including an identification information region for recording disk-specific identification information, wherein the management region has a flat portion formed by sectioning part of at least one of a groove and a land, the groove including a groovetrack and the land including a landtrack, wherein the disk-specific identification information is recorded as an irreversible record mark on the flat portion adjacent to a recording track and at least one of the groovetrack and the landtrack, wherein the predetermined threshold level is respectively set between each of the signal level of the flat portion and the signal level of the disk-specific identification information, and the signal level of the disk-specific identification information recorded on the at least one of the groovetrack and the landtrack other than the flat portion, and wherein the signal of the disk-specific identification information recorded as the irreversible record mark is used as a synchronization signal, and authenticity of the disk-specific identification information is judged.

14. The optical disk drive according to claim 13, wherein the circuit for judging authenticity of the disk-specific identification information executes an operation including any one selected from the group consisting of termination of recording and playback, alarm display, and discharge of the optical disk.

* * * * *